C. L. C. BATTMANN.
PERFUMING AND DISINFECTING APPARATUS.
No. 169,671. Patented Nov. 9, 1875.
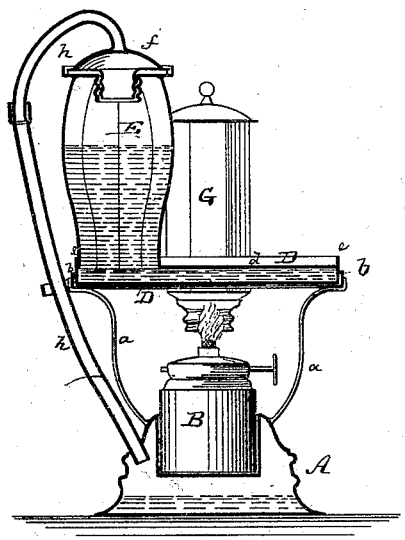
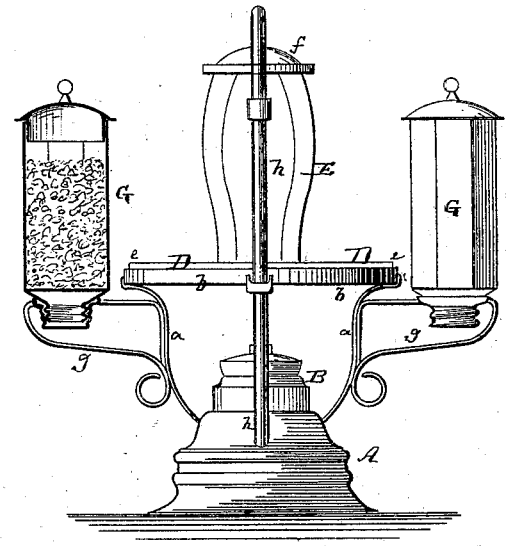
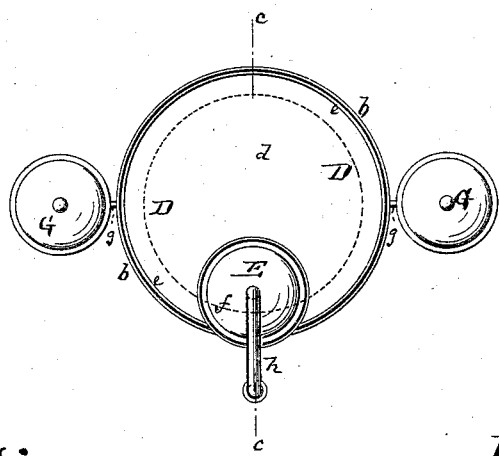
Witnesses:
A. Moraga.
Ernest C. Webb.
Inventor:
C. L. C. Battmann
by his attorney
A. v. Briesen

UNITED STATES PATENT OFFICE.

CARL L. C. BATTMANN, OF HOBOKEN, NEW JERSEY.

IMPROVEMENT IN PERFUMING AND DISINFECTING APPARATUS.

Specification forming part of Letters Patent No. 169,671, dated November 9, 1875; application filed October 16, 1875.

*To all whom it may concern:*

Be it known that I, CARL L. C. BATTMANN, of Hoboken, in the county of Hudson and State of New Jersey, have invented a new and Improved Perfuming and Disinfecting Apparatus, of which the following is a specification:

Figure 1 is a vertical section of my improved perfuming and disinfecting apparatus, on the line $c\ c$, Fig. 3. Fig. 2 is a side view, partly in section, of the same. Fig. 3 is a top view of the same.

Similar letters of reference indicate corresponding parts in all the figures.

This invention relates to an improved fumigating or disinfecting apparatus; and consists, more particularly, in interposing a hollow pan, which contains water, between the flame of a lamp and the perfuming-powder or substance to be decomposed, so that the water in the pan, when heated to boil, will gently warm the upper face of the pan on which the powder is placed, thereby evaporating the essential oils, without burning the body of the powder. The invention also consists in securing a reservoir upon the hollow pan for the purpose of obtaining a continuous supply of water to the pan. The invention also consists in surrounding the lamp with a condensing-chamber, which connects with the above-mentioned reservoir, and in other details hereinafter described.

A in the drawing is the hollow base of my improved perfuming or disinfecting apparatus. The same is made of sheet metal or other material, and is also shaped to receive and hold the lamp or candle B, as shown. $a\ a$ are arms fastened to and projecting upward from the hollow base A, and holding at their upper ends a flanged horizontal ring, $b$, at a short distance above the lamp B. D is a hollow pan, made, preferably, with a flat top, $d$, that is surrounded by a flange, $e$. The pan D is made of sheet metal or other proper material, and of a size to fit into the flange of the ring $b$, by which it is supported above the lamp B. E is a vessel or reservoir placed and fastened upon the pan D, and arranged to communicate with the interior thereof. This vessel or reservoir E is tightly closed by a screw-plug, $f$, or otherwise, and connects, by a pipe, $h$, with the interior of the hollow base A. G G are receptacles for the perfuming-powder. They are held in brackets $g\ g$, that project from the uprights $a\ a$, and serve to hold and store away the powder before it is used.

When it is desired to perfume or disinfect a room, water is filled into the reservoir E, from where it will flow into and entirely fill the hollow pan D. When the reservoir is nearly filled it is closed by the plug $f$. The disinfectant or other powder is now spread on the top of the hollow pan D, and the lamp B lighted. The water in the pan D will soon boil, and thereby heat the disk $d$ to such an extent that the essential oils contained in the powder will be gradually evaporated. The pan D is kept entirely full of water as long as any remains in the reservoir, and the overheating of the pan is thereby avoided. The water in the reservoir evaporates, by the pipe $h$, into the hollow base A, which acts as a condenser. The apparatus will thus operate effectively, without allowing any steam to escape into the room.

I claim as my invention—

1. In a perfuming or disinfecting apparatus, the combination of the hollow perfuming-pan D with the reservoir E, as set forth.

2. The combination of the hollow pan D, reservoir E, pipe $h$, and hollow base A, substantially as herein shown and described.

3. The combination of the support A, lamp B, arms $a\ a$, ring $b$, and hollow perfuming-pan D, as set forth.

4. The combination of the receptacle G with the frame $a\ b$ of a perfuming and disinfecting apparatus, and with the hollow pan D, substantially as specified.

5. The combined base, condenser, and lamp-support A of a perfuming apparatus, substantially as specified.

C. L. C. BATTMANN.

Witnesses:
A. V. BRIESEN,
ERNEST C. WEBB.